US008635408B2

(12) United States Patent
Levenstein et al.

(10) Patent No.: US 8,635,408 B2
(45) Date of Patent: Jan. 21, 2014

(54) CONTROLLING POWER OF A CACHE BASED ON PREDICTING THE INSTRUCTION CACHE WAY FOR HIGH POWER APPLICATIONS

(75) Inventors: Sheldon B. Levenstein, Austin, TX (US); David S. Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/984,300

(22) Filed: Jan. 4, 2011

(65) Prior Publication Data
US 2012/0173821 A1 Jul. 5, 2012

(51) Int. Cl.
*G06F 12/00* (2006.01)

(52) U.S. Cl.
USPC ........... 711/137; 711/125; 711/128; 711/151; 713/320; 713/324

(58) Field of Classification Search
USPC ........... 711/137, 125, 128, 151; 713/320, 324
See application file for complete search history.

(56) References Cited

U.S. PATENT DOCUMENTS

| 5,920,888 | A | 7/1999 | Shirotori et al. | |
| 7,443,759 | B1 | 10/2008 | Rowlands et al. | |
| 7,631,146 | B2 * | 12/2009 | Park et al. | 711/128 |
| 2004/0024968 | A1 | 2/2004 | Lesartre et al. | |
| 2004/0073749 | A1 | 4/2004 | Parthasarathy et al. | |
| 2007/0113057 | A1 | 5/2007 | Knoth | |
| 2008/0215865 | A1 * | 9/2008 | Hino et al. | 712/239 |
| 2009/0070531 | A1 * | 3/2009 | Venkumahanti et al. | 711/125 |
| 2009/0177858 | A1 | 7/2009 | Gschwind et al. | |
| 2009/0198900 | A1 * | 8/2009 | Knoth | 711/128 |
| 2010/0049912 | A1 * | 2/2010 | Mylavarapu | 711/108 |
| 2010/0064123 | A1 * | 3/2010 | Zuraski et al. | 712/239 |
| 2010/0146212 | A1 * | 6/2010 | Cohen et al. | 711/128 |
| 2011/0072215 | A1 * | 3/2011 | Takahashi | 711/125 |
| 2011/0320723 | A1 * | 12/2011 | Cohen et al. | 711/125 |

FOREIGN PATENT DOCUMENTS

EP 2 034 415 A1 3/2009

OTHER PUBLICATIONS

International Search Report and Written Opinion dated May 14, 2012 for International Application No. PCT/EP2011/071378, 10 pages.

(Continued)

*Primary Examiner* — Hong Kim
(74) *Attorney, Agent, or Firm* — Stephen J. Walder, Jr.; Matthew B. Talpis

(57) ABSTRACT

A mechanism for accessing a cache memory is provided. With the mechanism of the illustrative embodiments, a processor of the data processing system performs a first execution a portion of code. During the first execution of the portion of code, information identifying which cache lines in the cache memory are accessed during the execution of the portion of code is stored in a storage device of the data processing system. Subsequently, during a second execution of the portion of code, power to the cache memory is controlled such that only the cache lines that were accessed during the first execution of the portion of code are powered-up.

18 Claims, 7 Drawing Sheets

(56) References Cited

OTHER PUBLICATIONS

Inoue, Koji et al., "Way-Predicting Set-Associative Cache for High Performance and Low Energy Consumption", Proceedings 1999 International Symposium on Low Power Electronics and Design (ISLPED), San Diego, CA, Aug. 16-17, 1999, pp. 273-275.

Nicolaescu, Dan et al., "Reducing Power Consumption for High-Associativity Data Caches in Embedded Processors", Design, Automation and Test in Europe Conference and Exhibition, 2003 Munich, Germany, Mar. 3-7, 2003, 5 pages.

Park, Gi-Ho et al., "A Way Enabling Mechanism Based on the Branch Prediction Information for Low Power Instruction Cache", IEICE Transactions on Electronics Institute of Electronics, Tokyo, Japan, vol. E92C, No. 4, Apr. 1, 2009, pp. 517-521.

* cited by examiner

| PIPELINE STAGE | DESCRIPTION |
|---|---|
| IFM1 | THREAD SELECTED FOR FETCH, ALL BUFFERS ALLOCATED |
| IF0 | |
| IF1 | IFAR MUX CYCLE (EARLY WAY PREDICTION INFO NEEDED) |
| IF2 | ICACHE ACCESS CYCLE |
| IF3 | ICACHE WAY INFORMATION AVAILABLE |
| IF4 | |
| IF5 | |

US 8,635,408 B2

CONTROLLING POWER OF A CACHE BASED ON PREDICTING THE INSTRUCTION CACHE WAY FOR HIGH POWER APPLICATIONS

BACKGROUND

The present application relates generally to an improved data processing apparatus and method and more specifically to mechanisms for predicting which instruction cache ways are going to be utilized in a high power application and powering up only those instruction cache ways.

An instruction cache is a memory associated with a processor, which is smaller and faster than main memory, and is used to increase the speed by which the processor fetches instructions for execution. Instructions are typically retrieved from main memory and placed in the instruction cache so that they may be more quickly fetched by the processor when needed. Instruction caches may be either direct mapped caches, fully associative caches, or set associative caches. A direct mapped cache is one in which each location in main memory can be cached by only one cache location. A fully associative cache is one in which each location in main memory can be cached in any cache location. A set associative cache is one in which each location in main memory can be cached in any one of a subset of the cache locations in the cache, e.g., a 2-way set associative cache allows a location in main memory to be cached in one of 2 cache locations within the cache. When searching a cache for a particular instruction, in a direct mapped cache the processor only needs to search one cache location. In a fully associative cache, the processor would need to search all of the cache locations. In a set associative cache, the processor only needs to search a subset of cache locations based on the number of "ways," or cache lines, in which the memory location could be stored in the cache. Many modern instruction cache structures use a set associative cache approach.

With modern computing systems, the instruction cache can represent a significant amount of power consumption in the processor. Taking a set associative cache for example, because it cannot be known ahead of time which ways, i.e. cache lines, of the cache are going to be needed for a particular instruction fetch, all of the possible ways must be powered up. Thus, for example, in a 4-way set associative cache, i.e. a cache in which a memory location may be in any one of 4 possible cache locations, all 4 ways must be powered up in order to determine if the desired instruction is present in any one of the 4 ways. Because of this, as well as other timing and performance reasons, the instruction cache can represent a significant amount of the power consumption of the instruction fetch unit of the processor. For example, in some architectures, the instruction cache can represent approximately 30% of the power consumption of the instruction fetch unit of the processor.

For many modern processor chips, the frequency at which the processor can operate is dictated by how much power is used for worst case applications. These worst case applications are generally high performance scientific applications. To simulate these worst case applications, a power benchmark is typically used. These power benchmarks, as well as many other applications used during actual operation of the processor, are essentially code comprising a loop that executes over and over again to stress the resources of the processor.

SUMMARY

In one illustrative embodiment, a method, in a data processing system, is provided for accessing a cache memory is provided. With the method of the illustrative embodiments, a processor of the data processing system performs a first execution a portion of code. During the first execution of the portion of code, information identifying which cache fines in the cache memory are accessed during the execution of the portion of code is stored in a storage device of the data processing system. Subsequently, during a second execution of the portion of code, power to the cache memory is controlled such that only the cache lines that were accessed during the first execution of the portion of code are powered-up.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As discussed above, the instruction cache is a significant source of power consumption in the architecture of a processor chip. Moreover, power consumption is a factor in determining the frequency at which a processor chip may operate. Thus, the instruction cache can be a significant factor in causing the frequency of the processor to be set lower than it otherwise could be if power consumption were lower.

The illustrative embodiments provide a mechanism for reducing the power consumption of an instruction cache and thereby, increase the frequency at which a processor chip may operate. The power consumption of the instruction cache is reduced by using a predictive mechanism for predicting which ways of a set associative instruction cache will be needed by an executing code loop and then powering up only those ways that are predicted to be needed by the executing code loop. In this way, for a 4-way set associative instruction cache, approximately 75% of the instruction cache power can be conserved, thereby reducing the overall power consumption of the processor chip and increasing the frequency at which the processor chip may operate.

Figure 1:
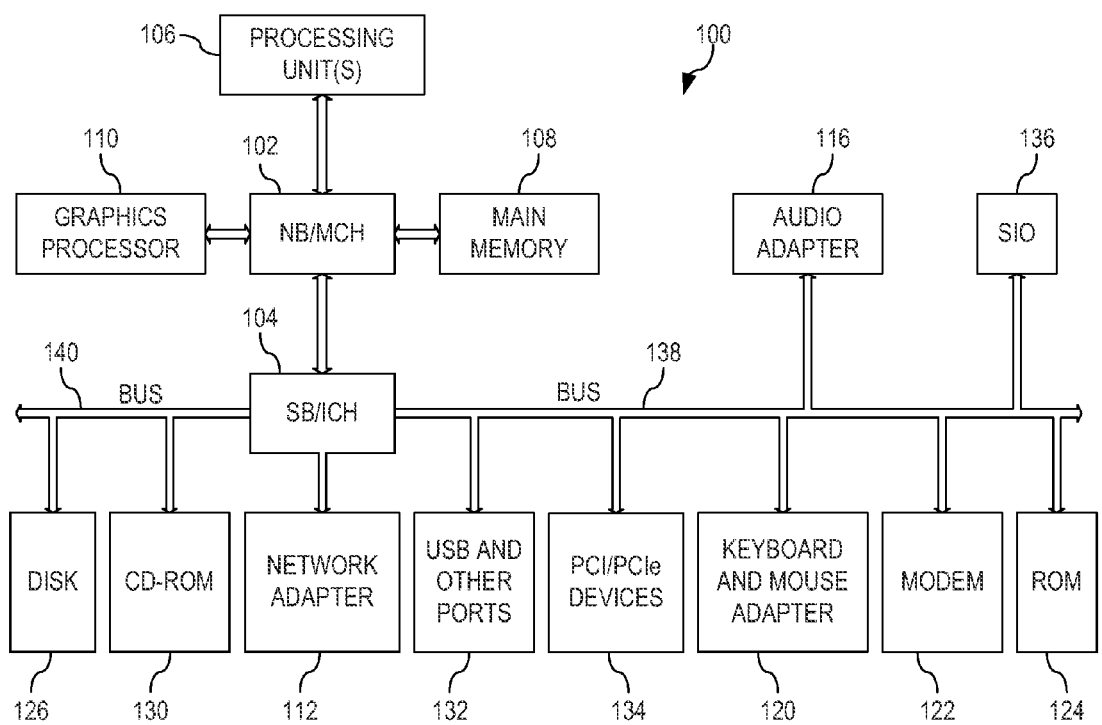
FIG. 1 is a block diagram of an example data processing system in which aspects of the illustrative embodiments may be implemented.

With reference now to FIG. 1, a block diagram of an example data processing system is shown in which aspects of the illustrative embodiments may be implemented. Data processing system 100 is an example of a computer, such as client 110 in FIG. 1, in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® 7 (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Figure 2:
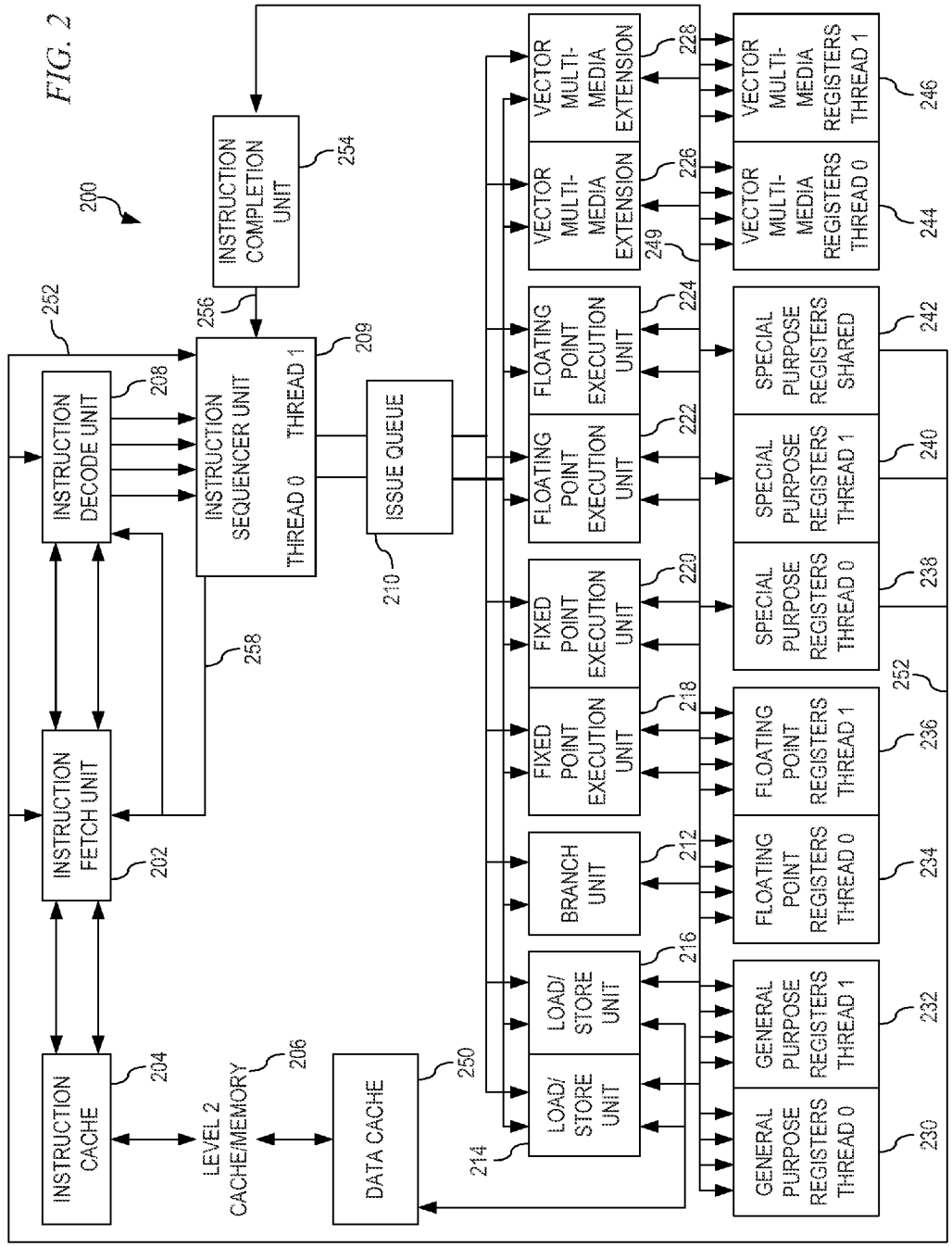
FIG. 2 is an example block diagram of a dual threaded processor design showing functional units and registers in accordance with an illustrative embodiment.

Referring to FIG. 2, an example block diagram of a dual threaded processor design showing functional units and registers is depicted in accordance with an illustrative embodiment. Processor 200 may be implemented as processing unit 106 in FIG. 1 in these illustrative examples. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention. Furthermore, the illustrative embodiments are not limited to only dual threaded architectures and may be implemented in any processor architecture in which a cache memory is utilized regardless of the number of threads of execution supported by the architecture, e.g., simultaneous multithreaded (SMT) 4 systems that support the execution of 4 threads simultaneously, single threaded systems, or the like.

Referring again to FIG. 2 as an example architecture in which illustrative embodiments of the present invention may be implemented, the instruction cache 204 may be configured as an N-way set associative instruction cache, where N is an integer number representing the number of ways, or cache lines, in which a memory location in main memory may be located. In one example implementation, the N-way set associative instruction cache is a 4-way set associative cache, meaning that when a memory location in main memory is to be stored in the instruction cache, it may be stored in 1 of 4 possible cache lines or ways within the instruction cache 204. Each cache line in the instruction cache 204 may be comprised of a plurality of sectors, with each sector storing one or more instructions. For example, in one example implementation, each cache line in the instruction cache 204 may comprise 4 sectors and each sector may store up to 8 instructions. It should be appreciated that this configuration of the instruction cache 204 is only an example and many modifications may be made to this configuration without departing from the spirit and scope of the illustrative embodiments. For example, N may be any appropriate size for the set associative instruction cache, each cache line may store more or less than 4 sectors, and each sector may store more or less than 8 instructions.

As mentioned previously, in known architectures, at each processor cycle, each of the ways of a set of ways in the N-way set associative instruction cache 204 corresponding to a required address, are read out and then one of the ways, i.e. the way having an address matching the required address, in the set is selected. Normally, there is no way to know ahead of time which of the ways in the set of ways will be selected. As a result, all of the ways in the set must be accessed.

During certain code sequences, such as a power benchmark application or high performance scientific applications that cause a large power consumption in the processor chip, a loop is actually being executed. In general, a loop causes the same set of instructions to execute repeatedly until some condition is encountered which causes a branching of the execution to another portion of code. As such, it is possible to predict which instructions are going to be fetched when executing a loop and it is possible to predict which cache locations in the instruction cache may be accessed to provide such instructions.

The illustrative embodiments comprise logic associated with the instruction cache 204 to detect that the execution of code in the processor has entered a loop and then store the sequence of instruction cache ways that are selected during execution of the loop. This information is then used in subsequent executions of the loop, or iterations of the loop, to predict which ways, or cache lines, of the instruction cache 204 that are going to be used to retrieve the instructions to be executed. Based on this prediction, only the ways that are predicted to be used are powered up to retrieve the corresponding required instruction for execution of the loop. If a misprediction occurs, then the logic exits the predictive control of powering up of the ways of the instruction cache 204 and starts powering up and accessing all of the ways of a set again until execution of a loop is again detected.

There may be a separate copy of the logic of the illustrative embodiments for each thread of execution supported by the processor architecture. Thus, if the processor architecture is a simultaneous multithreaded 2 (SMT2) processor architecture, meaning the architecture supports 2 threads being executed simultaneously, then 2 copies of the logic of the illustrative embodiments may be present within the processor architecture such that the predictive mechanisms may be used to predict cache way accesses for 2 portions of code being executed, one for each thread.

Figure 3:
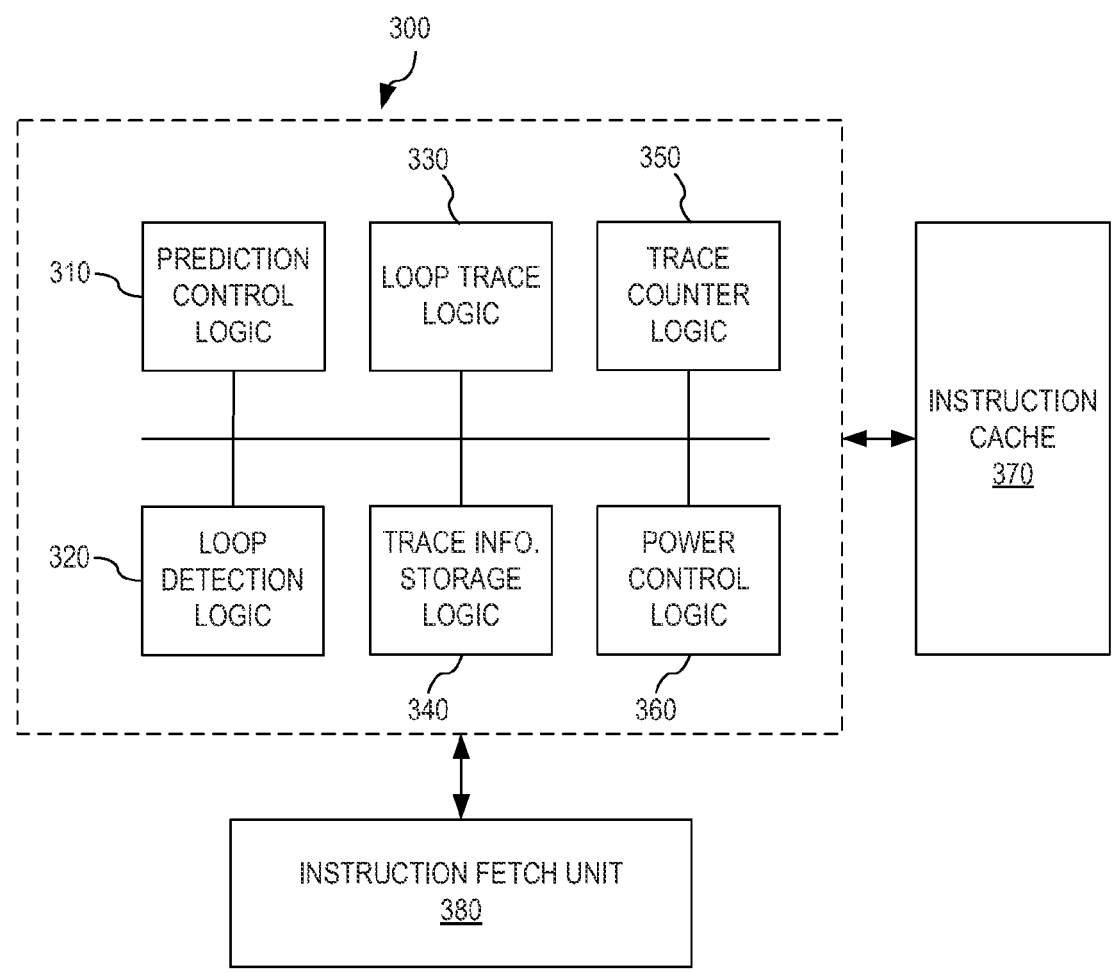
FIG. 3 is an example block diagram of instruction cache way prediction logic in accordance with one illustrative embodiment.

FIG. 3 is an example block diagram of instruction cache way prediction logic in accordance with one illustrative embodiment. As shown in FIG. 3, the instruction cache way prediction logic 300 includes prediction control logic 310, loop detection logic 320, loop trace logic 330, trace information storage logic 340, trace counter logic 350, and power control logic 360. The logic shown in FIG. 3 may be implemented as hardware logic, e.g., circuit elements, provided as part of a processor, such as processing unit 106 in FIG. 1 or processor 200 in FIG. 2. Alternatively, some or all of the logic in FIG. 3 may be implemented as software or a combination of software and hardware, such as firmware or the like.

The prediction control logic 310 controls the overall operation of the instruction cache way prediction logic 300 and orchestrates the operation of the other elements 320-360. The loop detection logic 320 may detect fetching, by instruction fetch unit 380, of a taken branch instruction, e.g., bht instruction, and may then initiate loop tracing by the loop trace logic 330. In addition, the loop detection logic 320 may operate to detect that execution of code has entered a loop, such as when a branch address corresponding to a previously fetched taken branch instruction is again encountered during execution, and in response, initiates predictive powering-up of ways, or cache lines, within the instruction cache 370.

The loop trace logic 330 operates to perform a trace of way information during the execution of a portion of code following a taken branch. That is, when the loop detection logic 320 detects the fetching of an instruction by the instruction fetch unit 380 that corresponds to a taken branch, e.g., a bht instruction, then the loop detection logic 320 stores the branch address, or a hashed version of the branch address to reduce the size of the stored branch address information, for the taken branch and begins collection of way information for code lines following the taken branch instruction. The instruction fetch unit 380 may fetch instructions in fetch groups consisting of a plurality of instructions, e.g., 8 instructions in a fetch group. A code line, i.e. a portion of code in a program being executed, may comprise multiple instructions from a fetch group. The collection, or tracking, of way information is not restarted again until either a flush of the fetch pipeline is performed or a predetermined number of fetch groups are accessed without encountering the branch address again.

The loop trace logic 330 stores the way information for code lines fetched by the instruction fetch unit 380 in the trace information storage logic 340. The way information that is collected may comprise, for example, an identifier of which way in the N-way set associative instruction cache 370 was accessed by the code line, how many sectors of the way, or cache line, were accessed, and if the cache line corresponding to the way, was left by a taken branch or by fetching sequentially to the next cache line.

This tracing performed by the loop trace logic 330 continues with each subsequent code line until either there is no more available storage in the trace information storage logic 340 or the instruction fetch unit 380 again encounters the original branch address of the taken branch stored in the loop trace logic 330. For each trace entry stored in the trace information storage logic 340, the trace counter logic 350 may increment a way count value to indicate how many way trace entries are stored in the trace information storage logic 340.

After collecting the way trace information for the portion of code corresponding to a taken branch in the manner described above, the loop detection logic 320 may determine whether the same branch address for the taken branch corresponding to the portion of code traced is again encountered. For example, the loop detection logic 320 may make a comparison between a currently taken branch instruction and the original branch instruction to see if there is a match. If a currently taken branch instruction does not match the original branch instruction, i.e. there is an unexpected branch, then the way prediction is aborted and the branch address of the currently taken branch is invalidated, thereby restarting the collection of way trace information again with regard to this unexpected branch. The way trace collection can be restarted, but more importantly the target instructions are refetched since the way prediction was incorrect.

If there is a match, then the instruction cache accesses for the portion of code corresponding to the currently taken branch instruction are monitored by the loop trace logic 330 to determine if the pattern of accesses match the pattern of access for the original branch instruction, i.e. the same ways, number of sectors, etc. accessed during the trace of the original branch instruction are accessed during this subsequent branch instruction. If so, then it is determined that the branch instruction corresponds to a repeating loop in the executing code. If the access patterns do not match in some way, i.e. there is a predictive mismatch, then the predictive way mechanisms of the illustrative embodiments cannot be used to predictively power-up the ways of the instruction cache.

This process may be repeated a predetermined number of times to determine if the loop is repeating. That is, the way prediction mechanisms may be utilized initially to if the branch prediction mechanisms operate accurately for the predetermined number of times in order to make sure it is more likely that the loop will continue to repeat without exiting out of the loop prematurely. For example, the above process for ensuring that the access pattern repeats may be performed for a predetermined amount of time, a predetermined number of iterations of the loop, or the like. If there is a misprediction prior to this number of times, then the use of the way prediction mechanisms to perform actual predictive powering-up of ways of the instruction cache is aborted or otherwise not performed.

If it is determined that the loop is repeating, then the predictive power-up mechanisms of the illustrative embodiments are utilized to power-up only the cache lines, or ways, that are predicted to be accessed by the repeating loop based on the way information collected during the trace and stored in the trace information storage logic 340. Using the predictive power-up mechanisms of the illustrative embodiments, upon encountering the branch address for the loop, the power control logic 360 operates to power-up only the ways, or cache lines, corresponding to the way information stored in the trace information storage logic 340. More specifically, the power control logic 360 steps through the way information for each line of code executed after the branch and powers-up the corresponding way while keeping the other ways of the cache line set in a low power state. The stepping through of the way information is facilitated by the trace counter logic 350. That is, a second counter may be incremented with each code line and way prediction, and the count may be compared to the way counter value generated during the trace by the loop trace logic 330. Once the two counts match, i.e. the end of the trace is encountered, the predictive power-up mechanism may discontinue predictive power-up operations and they may be restarted once the branch address is encountered again.

Thus, with the mechanisms of the illustrative embodiments, only the individual way needed to retrieve the instruction(s) for a particular line of code in a repeating loop is powered-up rather than having to power-up all of the ways in a corresponding set of a N-way set associative cache. For example, in a 4-way set associative cache, rather than having to power up all 4 ways for each instruction cache access, only 1 of the 4 ways needs to be powered-up using the predictive power-up mechanisms. This leads to a 75% reduction in power consumption by the instruction cache. If at any time there is a misprediction of which way needs to be powered-up using the mechanisms of the illustrative embodiments, i.e. the required instructions are not present in the powered-up way, then the predictive power-up operations of the illustrative embodiments are discontinued and operation returns to the normal operation of powering-up all of the ways of the set. In such a case, the instruction cache is re-accessed with the way prediction mechanisms not operating to perform the predictive power-up of ways, and the way prediction logic is reset, i.e. no way trace information is valid and collection of way trace information is restarted.

If a branch redirect (predicted taken branch) occurs during the predictive power-up operation, the power control logic 360 may control the powering-up of ways of the instruction cache such that none of the ways are powered-up for a predetermined number of cycles. The predetermined number of cycles is equal to a number of cycles corresponding to a delay in fetching the target instruction. Normally, any instructions received during this delay period would be discarded. Using the mechanisms of the illustrative embodiments, the powering-up of the instruction cache during this period is conserved such that the power consumed to fetch instructions that are just going to be thrown away is saved. In one illustrative embodiment, this predetermined number of cycles is 2 processor cycles, although any number of processor cycles may be used, depending upon the architecture, without departing from the spirit and scope of the illustrative embodiments.

It should be appreciated that while FIG. 3 illustrates the various logic 310-360 as being separate logic units, the illustrative embodiments are not limited to such. Rather, the various ones or all of the logic 310-360 may be integrated with one another. Moreover, while FIG. 3 shows the instruction cache way prediction logic 300 as being separate from the instruction cache 370 and instruction fetch unit 380, the illustrative embodiments are not limited to such. Rather the instruction cache way prediction logic 300, or one or more of logic 310-360, may be integrated with either or both of the instruction cache 370 and instruction fetch unit 380. In one illustrative embodiment, the instruction cache way prediction logic 300 is integrated with the instruction cache 370 control mechanisms.

Figures 4A, 4B:
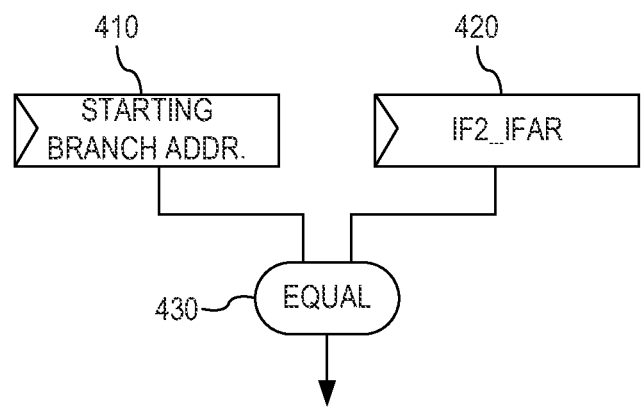
FIG. 4A illustrates the pipeline stages of an instruction fetch pipeline in accordance with one illustrative embodiment.
FIG. 4B illustrates example logic for determining if a fetch address matches a staring branch address in accordance with one illustrative embodiment.
Figure 4C:
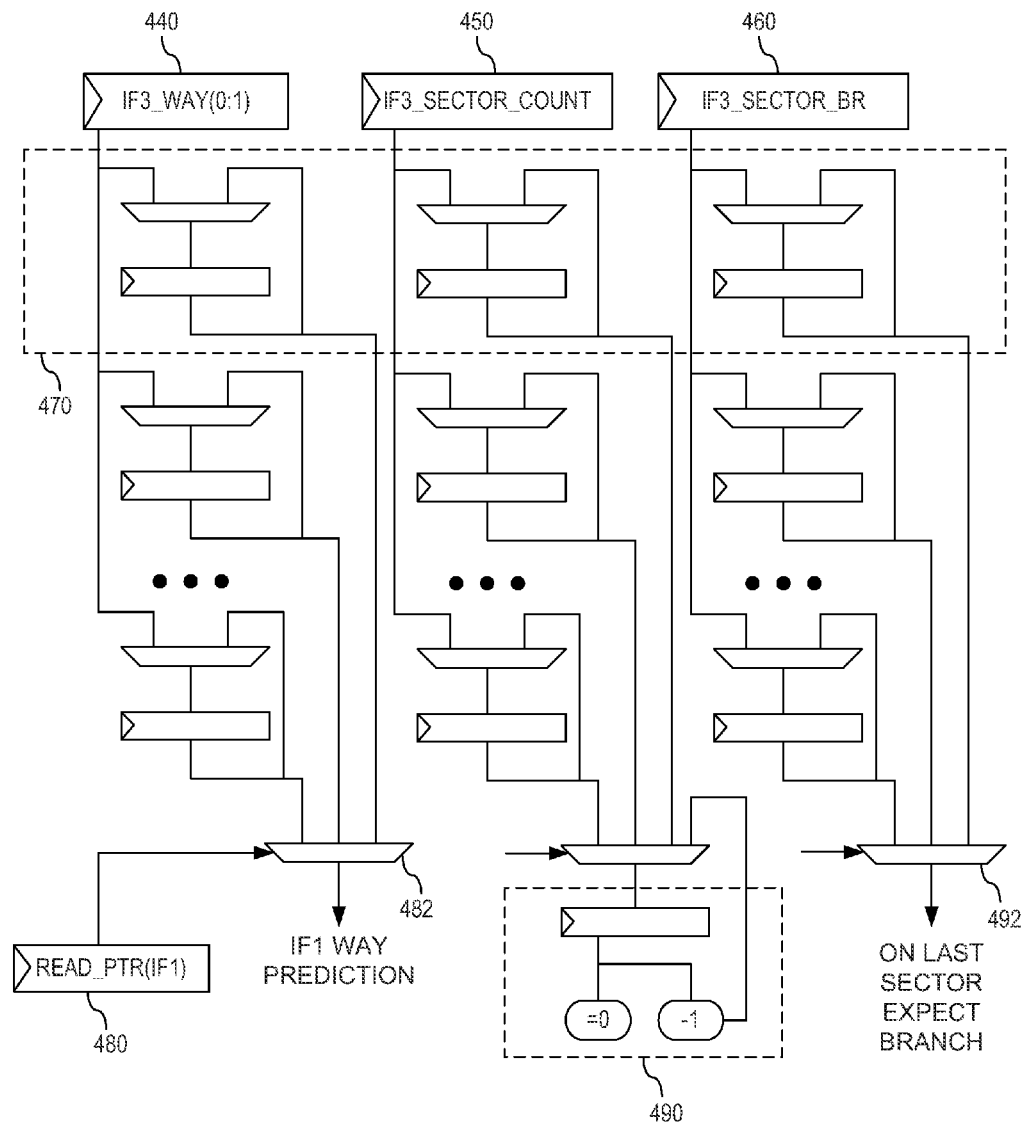
FIG. 4C illustrates example logic for storing way information as part of a trace of the execution of a portion of code and for using the trace information to predict ways to power-up in accordance with one illustrative embodiment.

To better understand the way in which the tracing, prediction, and power-up mechanisms of the illustrative embodiments operate, reference is now made to FIGS. 4A-4C. FIG. 4A illustrates the pipeline stages of an instruction fetch pipeline in accordance with one illustrative embodiment. FIG. 4B illustrates example logic for determining if a fetch address matches a staring branch address in accordance with one illustrative embodiment. FIG. 4C illustrates example logic for storing way information as part of a trace of the execution of a portion of code, e.g., a repetitive loop, and for using the trace information to predict ways to power-up in accordance with one illustrative embodiment.

As shown in FIG. 4A, the instruction fetch pipeline includes a plurality of stages IFm1 to IF5 in the example illustrative embodiment. At a first stage, i.e. stage instruction fetch minus 1 (IFm1), a thread is selected for fetching of an instruction and corresponding instruction fetch buffers are allocated. Thereafter, at instruction fetch stage IF1, the address in the instruction fetch address register (IFAR) is compared with a starting branch address to determine if the IFAR address matches the starting branch address, as described hereafter. In instruction fetch stage IF2, the instruction cache is accessed to retrieve the instruction corresponding to the current instruction fetch address register address. Thereafter, in instruction fetch stage IF3, the way information for the instruction cache access that occurred in instruction fetch stage IF2 is available and may be stored in the trace information storage logic 340.

Referring now to FIG. 4B, as shown, a new starting branch address is stored in the starting branch address register 410 when there is no valid address in the IF2_IFAR register 420, i.e. when no IFAR is assigned in a given processor cycle, there is no valid address. This may occur, for example, when there is a reset due to a flush of the instruction fetch pipeline, if the original branch address is not again encountered within a predetermined period of time, or if any other type of flush occurs, such as a flush as a result of a branch mis-prediction or any other event that requires a flush with instructions needing to be refetched. When a new starting address is stored in the register 410, a trace of way information is initiated as described in greater detail hereafter with regard to FIG. 4C. The comparator 430 is used to compare the address in the instruction fetch address register (IFAR) 420 with the starting branch address in register 410. When the addresses in registers 410 and 420 match, it implies that the trace information starts at the next valid IFm1 stage of the instruction fetch pipeline, i.e. the next fetched instruction which is a target instruction of the branch instruction. Thus, a read pointer can be set to point to the first entry in the trace information storage logic 340, again as described in FIG. 4C hereafter.

If the addresses in registers 410 and 420 matched, then the branch whose target is the start of the trace has been encountered. When the addresses in registers 410 and 420 do not match, and way prediction is being performed, the mechanism progresses through the stored way prediction information. In other words, if the addresses do not match and the branch is anticipated, then the mechanisms of the illustrative embodiments progress to the next trace entry. If the branch fetch address matches, then the mechanisms of the illustrative embodiments reset the trace pointer so that the next fetch is to the first trace entry.

Referring now to FIG. 4C, when a new starting branch address is encountered during the fetching of instructions, way information for the fetching of the branch instruction is stored in the registers 440-460. Way information is only stored in registers 440-460 and subsequently in one of the sets of logic 470 upon accessing a last sector of the selected way in the instruction cache or on encountering a taken branch.

For example, an identifier of the particular way in the way set of the instruction cache that was accessed to retrieve the corresponding instruction is stored in register 440. A sector count, corresponding to the number of sectors accessed within the identified way is stored in register 450. An indicator of whether the sectors accessed ended in a taken branch or not is stored in register 460. This information is latched into a first set of registers using logic set 470. There may be multiple logic sets 470 provided for storing way information for a plurality of code lines of a portion of code corresponding to the starting branch address, e.g., code lines of the repeating loop. For these code lines, up to a total number of logic sets 470 provided, the same way information is stored in corresponding registers of a next lower logic set 470.

Each of the logic sets 470 represents an "entry" in the trace information storage logic 340. Once all of the entries are filled with way information, continued tracing is not performed. In one illustrative embodiment, as way information is stored in the entries, or logic sets 470, a counter (not shown) is incremented. The counter's maximum value to which it is incremented is used as a basis for identifying the highest number of trace entries used to track way information for the portion of code. This counter maximum value may be later used to read out way information when performing predictive power control of the instruction cache. Thus, the counter provides a length of the trace. This counter is optional and is not necessary to the operation of the illustrative embodiments but may provide additional information about the trace, e.g., the length, and may assist in other operations of the illustrative embodiments, such as reading out way information.

When an address corresponding to the starting branch address is again encountered, i.e. the addresses in register 410 and 420 are equal, reading out of the way information from the entries, or logic sets, 470 is performed. A read pointer 480 is used to select an output from multiplexers 482-484. That is, the read pointer 480 is incremented with each subsequent fetch of instructions by the instruction fetch unit and a corresponding way, i.e. corresponding to the way identified in first register of the corresponding entry 470, is read out using multiplexer 482 and the read pointer 480 as a selector signal. The read pointer is only incremented on the last sector of a predicted way, e.g., if the sector count is 2, then the entry is valid for 3 instruction fetches, i.e. 3 fetch groups, and after the third instruction fetch, the read pointer is incremented. The output of the multiplexer 482 is the way prediction for the particular instruction fetch and is used to powered-up the predicted way in the instruction cache rather than powering-up all of the ways of the set in the instruction cache. That is, the output from the multiplexer 482 may be input to the power control logic 360 which operates to power-up only the way, or cache line, in the instruction cache corresponding to the output of the multiplexer 482.

The logic 490 is used to increment through the sectors accessed in the predicted way and is used as a way for determining how many instruction fetches the entry is valid for, after which the read pointer is incremented as noted above. When the value in the register of logic 490 is equal to zero, this implies that a last sector of the selected entry, corresponding to a cache line or way, has been read and thus, there is no more need to access the selected entry. As a result, the read pointer 480 may be incremented. With the incrementing of the read pointer 480, a next way is selected from a next entry, or logic set 470 and the process repeats. It should be noted that if the addresses in registers 410 and 420 match, instead of incrementing the read pointer 480, the read pointer 480 is reset.

When the logic identifies a branch this implies that the target address will not be available until after a predetermined number of "dead" cycles, e.g., 2 cycles, while the target instruction for the branch is fetched. Those dead cycles are not represented in the trace entries and are squashed. During those dead cycles, with the mechanisms of the illustrative embodiments, no ways in the instruction cache are powered up since the fetch is for the instructions after the taken branch and would be discarded. It should be noted that this is a number of dead cycles, not fetch groups. Thus, if the IFAR address is not assigned to the current thread during those dead cycles, prediction of ways is still started on the next cycle following the dead cycles. The logic of the last column in FIG. 4, culminating in the output from multiplexer 492, is used to identify when such a branch is expected in the last sector of the predicted instruction cache way and thus, the output of the multiplexer 492 may be used to control the predictive power-up mechanisms to cause them to not power-up any of the ways of the instruction cache for the predetermined number of dead cycles.

As will be appreciated by one skilled in the art, the present invention may be embodied as an apparatus, system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
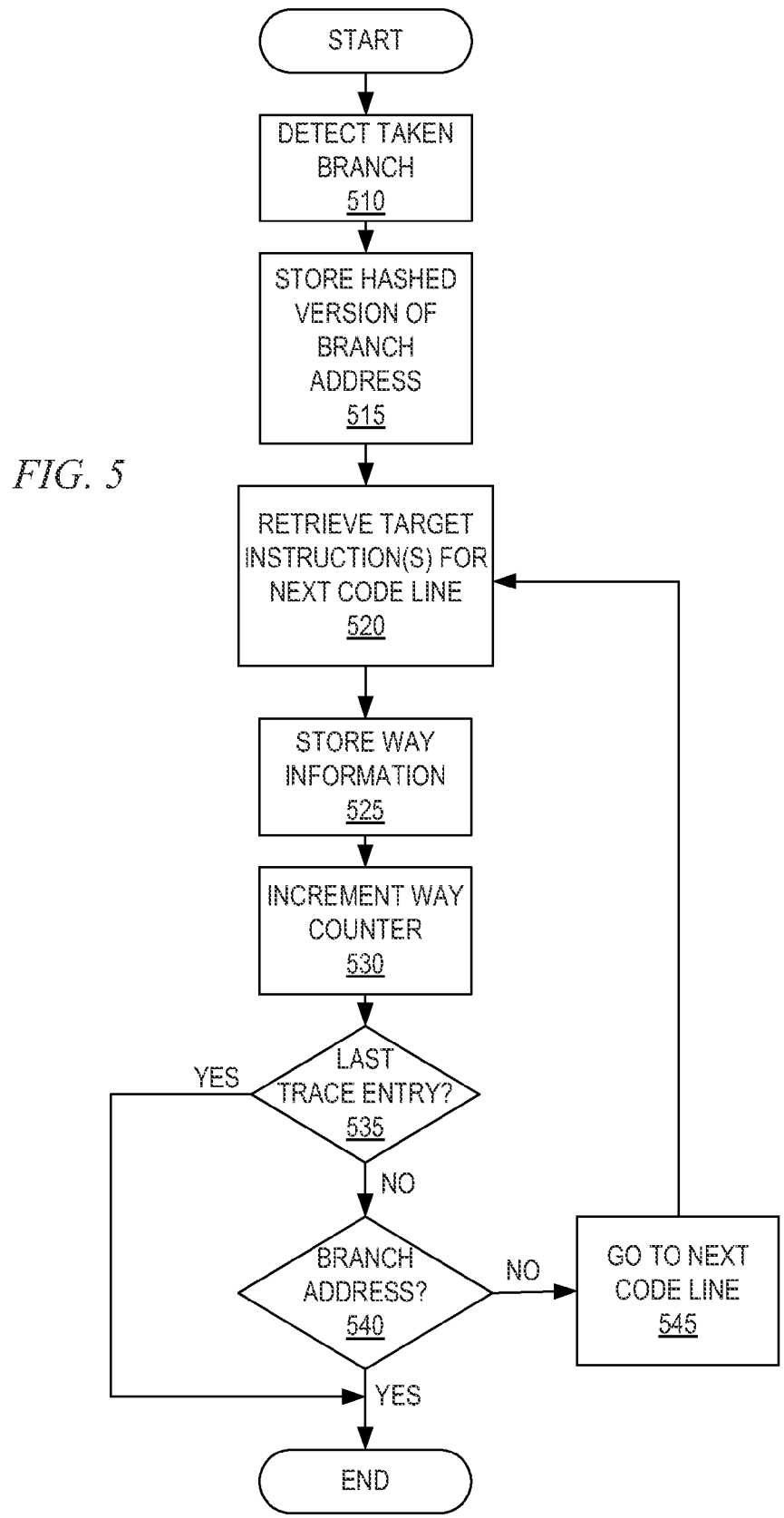
FIG. 5 is a flowchart outlining an example operation for tracing instruction cache way information during the execution of a portion of code in accordance with one illustrative embodiment.

FIG. 5 is a flowchart outlining an example operation for tracing instruction cache way information during the execution of a portion of code in accordance with one illustrative embodiment. As shown in FIG. 5, the operation starts by detecting a taken branch (step 510). The branch address for the taken branch, or a hashed version of the branch address, is stored (step 515) and target instruction(s) for the next code line are retrieved (step 520). Way information for the way accessed in the instruction cache to retrieve the target instruction(s) for the next code line is stored in trace storage logic (step 525). A way counter is then incremented (step 530).

A determination is made as to whether a last trace entry has been reached in the trace storage logic (step 535). If no, then a determination is made as to whether an address of a next code line corresponds to the starting branch address stored in steps 515 (step 540). If not, then the operation goes to the next code line (step 545) and the operation returns to step 520. If the branch address is again received in the next code line, or if the last trace entry is reached in step 535, then the operation terminates. That is, if the starting address for the trace, i.e. the branch address, is again fetched while performing the trace, then the operation in FIG. 5 terminates since this implies that the execution is looping back to the start of the branch. Moreover, if there are no more registers available to store trace information, then the trace is also terminated.

Figure 6:
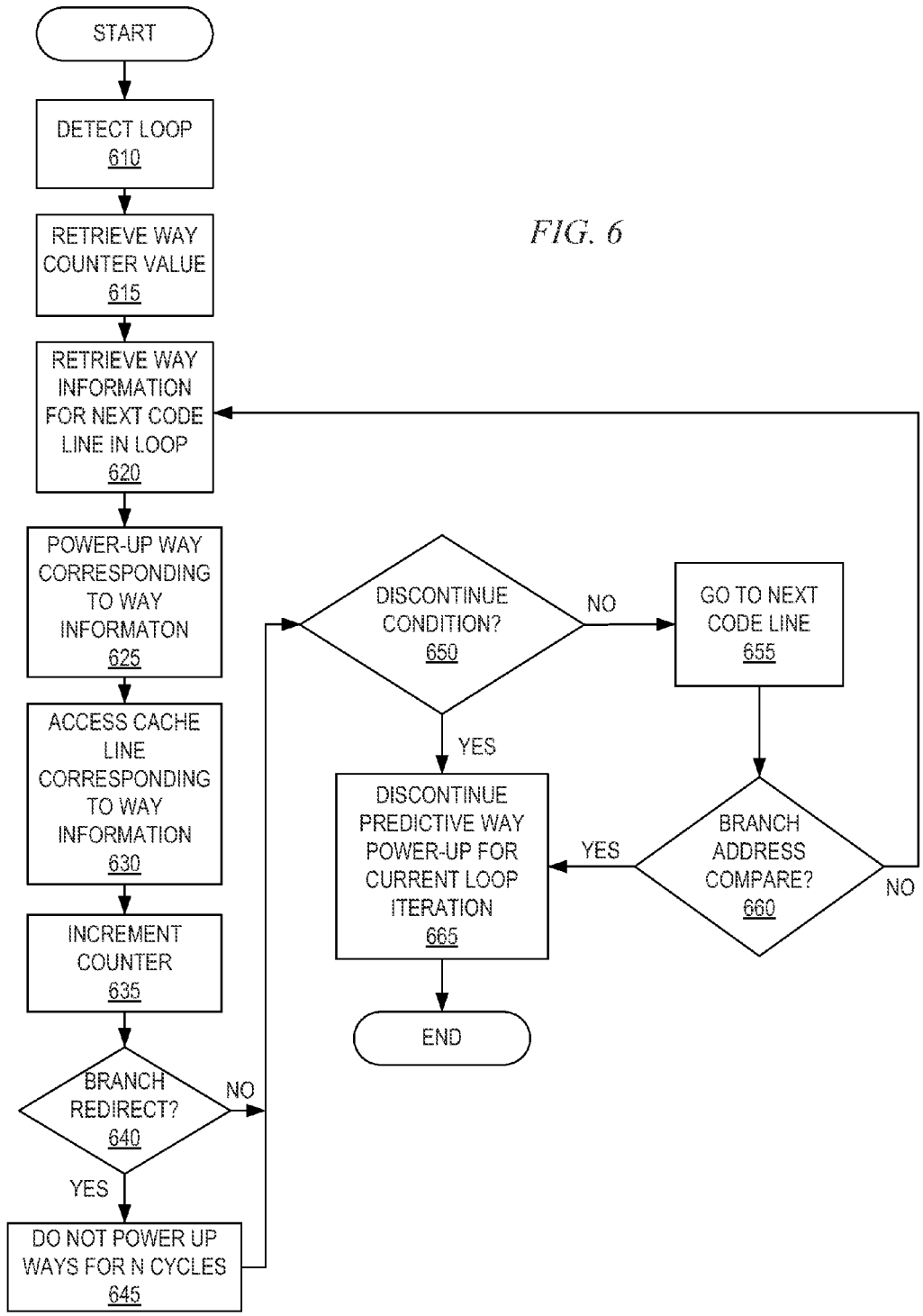
FIG. 6 is a flowchart outlining an example operation for using stored instruction cache way information to predictively power-up ways of an instruction cache in accordance with one illustrative embodiment.

FIG. 6 is a flowchart outlining an example operation for using stored instruction cache way information to predictively power-up ways of an instruction cache in accordance with one illustrative embodiment. As shown in FIG. 6, the operation starts by detecting that the code execution has entered a repetition loop (step 610). This may be detected, for example, by determining that the branch address is again encountered by the instruction fetch unit. In response to the detection of the loop, a way counter value is retrieved (step 615) and way information for the next code line in the loop is retrieved (step 620). The way corresponding to the way information for the next code line is powered up (step 625) and the cache line is accessed (step 630). It should be noted that the flowchart assumes that the cache line access does not result in a misprediction. However, if there is a misprediction, i.e. the address is not present in the predicted way or cache line, then the operation in FIG. 6 is aborted and accessing the cache reverts back to a known methodology of powering-up all of the ways of a set in the N-way set associative instruction cache.

When accessing the cache line or way, a read counter is incremented (step 635) and a determination is made as to whether there is a branch redirect when accessing the cache line or way (step 640). If a branch redirect is encountered, then none of the ways or cache lines in the instruction cache are powered up for a predetermined number of N cycles (step 645).

Thereafter, or if there is no a branch redirect, a determination is made as to whether the a discontinue condition has occurred (step 650). This discontinue condition may be, for example, if the operation runs out of trace entries, a flush occurs, a cache miss occurs, a way was not the expected or predicted way, the read counter value equals the way counter value, or the like. If not, then the execution goes to the next code line (step 655) and a determination is made as to whether a branch address compare is encountered for comparing a branch address to the starting branch address of the loop (step 660). If so, or if the read counter value equals the way counter value, then the predictive way power-up operations for the current loop iteration are discontinued (step 665). These operations may be performed again for a next iteration of the loop by starting the operation of FIG. 6 again at step 610. If a branch address compare is not encountered, then the operation returns to step 620 and the operation continues until either the read counter value equals the way counter value or a branch address compare is encountered.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accessing a cache memory, comprising:
   performing, by a processor of the data processing system, a first execution of a portion of code;
   storing, in a storage device of the data processing system, during the first execution of the portion of code, information identifying which cache lines in the cache memory are accessed during the first execution of the portion of code;
   during a second execution of the portion of code, as instructions in the portion of code are executed, predicting which cache lines in the cache memory will be accessed during the second execution of the portion of code based on the stored information identifying which cache lines in the cache memory were accessed during the first execution of the portion of code; and
   controlling power to the cache memory, during the second execution of the portion of code, based on the prediction of which cache lines in the cache memory will be accessed, such that only the cache lines that were accessed during the first execution of the portion of code are powered-up, wherein the portion of code is a loop, and wherein the method is performed in response to a detection of the portion of code being a loop.

2. The method of claim 1, wherein predicting which cache lines in the cache memory will be accessed during the second execution of the portion of code comprises, for each instruction in the portion of code, during the second execution of the portion of code, identifying a cache line accessed during the first execution of the portion of code when executing the instruction.

3. The method of claim 1, wherein the cache memory is a set associative cache memory and wherein, for each instruction in the portion of code, only a single cache line, in a set of cache lines in the set associative cache memory corresponding to the instruction, is powered-up while other cache lines in the set of cache lines are not powered-up.

4. The method of claim 1, wherein the detection of the portion of code being a loop is performed by storing a branch address of a branch instruction associated with the portion of code during the first execution of the portion of code and identifying an address matching the branch address during the second execution of the portion of code.

5. The method of claim 1, wherein storing information identifying which cache lines in the cache memory are accessed during the first execution of the portion of code comprises storing, for each sub-portion of the portion of code, an identifier of a corresponding cache line accessed, a number of sectors of the cache line accessed, and an identifier of whether a branch is taken when execution leaves the cache line.

6. The method of claim 1, wherein the method is performed separately for each thread of execution in the data processing system.

7. The method of claim 1, wherein performing the method is discontinued in response to detection of a misprediction of cache lines being accessed during the second execution of the portion of code.

8. A method, in a data processing system, for accessing a cache memory, comprising:
performing, by a processor of the data processing system, a first execution of a portion of code;
storing, in a storage device of the data processing system, during the first execution of the portion of code, information identifying which cache lines in the cache memory are accessed during the first execution of the portion of code;
during a second execution of the portion of code, as instructions in the portion of code are executed, predicting which cache lines in the cache memory will be accessed during the second execution of the portion of code;
controlling power to the cache memory, during the second execution of the portion of code, based on the prediction of which cache lines in the cache memory will be accessed, such that only the cache lines that were accessed during the first execution of the portion of code are powered-up;
detecting if a branch redirect occurs during the second execution of the portion of code; and
in response to detecting the branch redirect, suspending powering-up of all cache lines in the cache memory for a predetermined number of processor cycles.

9. The method of claim 8, wherein the predetermined number of processor cycles corresponds to a delay associated with fetching a target address of the branch redirect.

10. An apparatus, comprising:
a processor; and
a cache memory coupled to the processor, wherein the processor:
performs a first execution of a portion of code,
stores, in the trace information storage logic, during the first execution of the portion of code, information identifying which cache lines in the cache memory are accessed during the first execution of the portion of code;
predicts, during a second execution of the portion of code, as instructions in the portion of code are executed, which cache lines in the cache memory will be accessed during the second execution of the portion of code based on the stored information identifying which cache lines in the cache memory were accessed during the first execution of the portion of code; and
controls power to the cache memory, during the second execution of the portion of code, based on the prediction of which cache lines in the cache memory will be accessed, such that only the cache lines that were accessed during the first execution of the portion of code are powered-up, wherein the portion of code is a loop, and wherein the processor stores information identifying which cache lines in the cache memory are accessed, predicts which cache lines in the cache memory will be accessed, and controls power to the cache memory in response to a detection of the portion of code being a loop.

11. The apparatus of claim 10, wherein the processor predicts which cache lines in the cache memory will be accessed during the second execution of the portion of code by identifying, for each instruction in the portion of code, during the second execution of the portion of code, a cache line accessed during the first execution of the portion of code when executing the instruction.

12. The apparatus of claim 10, wherein the cache memory is a set associative cache memory and wherein, for each instruction in the portion of code, only a single cache line, in a set of cache lines in the set associative cache memory corresponding to the instruction, is powered-up while other cache lines in the set of cache lines are not powered-up.

13. The apparatus of claim 10, wherein the processor detects that the portion of code is a loop by storing a branch address of a branch instruction associated with the portion of code during the first execution of the portion of code and identifying an address matching the branch address during the second execution of the portion of code.

14. The apparatus of claim 10, wherein the processor stores information identifying which cache lines in the cache memory are accessed during the first execution of the portion of code by storing, for each sub-portion of the portion of code, an identifier of a corresponding cache line accessed, a number of sectors of the cache line accessed, and an identifier of whether a branch is taken when execution leaves the cache line.

15. The apparatus of claim 10, wherein the processor performs the first execution, stores information identifying which cache lines in the cache memory are accessed, performs the second execution, predicts which cache lines in the cache memory will be accessed, and controls power to the cache memory separately for each thread of execution in the processor.

16. An apparatus, comprising:
a processor; and
a cache memory coupled to the processor, wherein the processor:
performs a first execution of a portion of code,
stores, in the trace information storage logic, during the first execution of the portion of code, information identifying which cache lines in the cache memory are accessed during the first execution of the portion of code;
predicts, during a second execution of the portion of code, as instructions in the portion of code are executed, which cache lines in the cache memory will be accessed during the second execution of the portion of code;
controls power to the cache memory, during the second execution of the portion of code, based on the prediction of which cache lines in the cache memory will be accessed, such that only the cache lines that were accessed during the first execution of the portion of code are powered-up;

detects if a branch redirect occurs during the second execution of the portion of code; and in response to detecting the branch redirect, suspends powering-up of all cache lines in the cache memory for a predetermined number of processor cycles.

17. The apparatus of claim 16, wherein the predetermined number of processor cycles corresponds to a delay associated with fetching a target address of the branch redirect.

18. A computer program product comprising a non-transitory computer readable storage medium having a computer readable program stored therein, wherein the computer readable program, when executed on a computing device, causes the computing device to:

perform a first execution of a portion of code;

store, in a storage device of the computing device, during the first execution of the portion of code, information identifying which cache lines in a cache memory of the computing device are accessed during the first execution of the portion of code;

predict, during a second execution of the portion of code, as instructions in the portion of code are executed, which cache lines in the cache memory will be accessed during the second execution of the portion of code based on the stored information identifying which cache lines in the cache memory were accessed during the first execution of the portion of code; and control power to the cache memory, during the second execution of the portion of code, based on the prediction of which cache lines in the cache memory will be accessed, such that only the cache lines that were accessed during the first execution of the portion of code are powered-up, wherein the portion of code is a loop, and wherein the computer program product causes the computing device to store information identifying which cache lines in the cache memory are accessed, predict which cache lines in the cache memory will be accessed, and control power to the cache memory in response to a detection of the portion of code being a loop.

* * * * *